(12) United States Patent
Schoof et al.

(10) Patent No.: US 11,486,535 B2
(45) Date of Patent: Nov. 1, 2022

(54) COMPACT LEAF SPRING ASSEMBLIES

(71) Applicant: Microsoft Technology Licensing, LLC, Redmond, WA (US)

(72) Inventors: Craig Crandall Schoof, Pasco, WA (US); Brian David Bitz, Woodinville, WA (US); Joseph Benjamin Gault, West Linn, OR (US); Scott Douglas Bowers, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/912,163

(22) Filed: Jun. 25, 2020

(65) Prior Publication Data
US 2021/0404598 A1 Dec. 30, 2021

(51) Int. Cl.
*F16M 13/00* (2006.01)
*F16M 11/10* (2006.01)
*G06F 1/16* (2006.01)

(52) U.S. Cl.
CPC .......... *F16M 13/005* (2013.01); *F16M 11/10* (2013.01); *G06F 1/166* (2013.01)

(58) Field of Classification Search
CPC . F16F 1/027; F16F 1/185; F16F 1/187; G06F 1/166; F16M 13/005
USPC ................................................... 267/45, 46
See application file for complete search history.

(56) References Cited

U.S. PATENT DOCUMENTS

| | | | |
|---|---|---|---|
| 1,452,973 A | 4/1923 | Jenkins | |
| 2,661,043 A | 12/1953 | Bables | |
| 3,597,522 A | 8/1971 | Kobayashi | |
| 4,830,343 A * | 5/1989 | Johnson | E02B 3/26 267/44 |
| 9,836,092 B2 * | 12/2017 | Miao | F16M 11/10 |
| 10,036,442 B2 * | 7/2018 | Mao | F16F 1/027 |
| 2012/0025435 A1 * | 2/2012 | Liu | F16F 3/02 267/151 |
| 2015/0183493 A1 | 7/2015 | Zwaan | |
| 2019/0064886 A1 | 2/2019 | Wendt | |
| 2020/0088257 A1 * | 3/2020 | Imaizumi | F16F 1/185 |

FOREIGN PATENT DOCUMENTS

| | | |
|---|---|---|
| DE | 102011018589 A1 | 10/2012 |
| EP | 1184532 A1 | 3/2002 |
| EP | 2610520 A1 | 7/2013 |
| GB | 191322472 A | 7/1914 |
| GB | 862958 A | 3/1961 |
| WO | 2002066854 A1 | 8/2002 |
| WO | 2015167516 A1 | 11/2015 |

OTHER PUBLICATIONS

"International Search Report and Written Opinion issued in PCT Application No. PCT/US21/028521", dated Jul. 13, 2021, 11 Pages.

* cited by examiner

*Primary Examiner* — Bradley Duckworth
(74) *Attorney, Agent, or Firm* — Rainier Patents, P.S.

(57) ABSTRACT

The present description relates to devices that include portions that are moveable relative to one another. One example device includes a leaf spring positioned to receive forces between a first portion and a second portion. The leaf spring can extend from a first end to a second end and can define a perimeter where the first end and the second end are contained within the perimeter and the first end and the second end are not secured to either the first portion or the second portion.

21 Claims, 13 Drawing Sheets

COMPACT LEAF SPRING ASSEMBLIES

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing portions that can be moved relative to one another. One or more leaf springs can be positioned as a biasing agent to receive and deliver forces between the first portion and second portion. The leaf springs can extend from a first end to a second end to define a perimeter. In contrast with traditional configurations, the first and second ends can be contained within the perimeter and not secured to either the first portion or the second portion. Instead interim regions of the leaf springs receive and/or deliver forces between the first and second portions. This configuration provides a high displacement spring mechanism that can fit within constrained spaces in the device and can be customized to provide a desired force profile. These and other aspects are discussed below.

Figure 1:
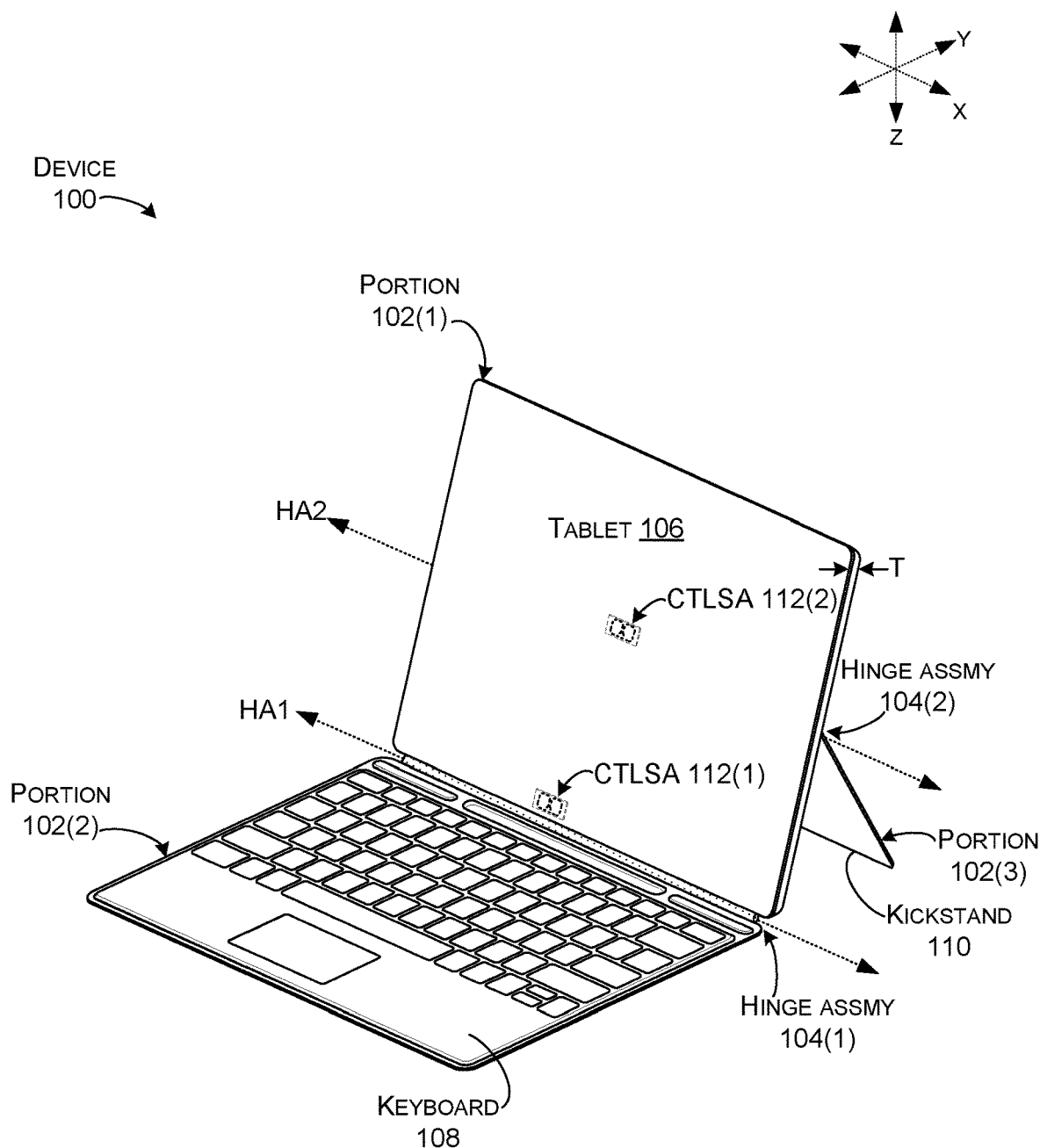
FIGS. 1, 2A, 2B, and 3A show perspective views of example devices in accordance with some implementations of the present concepts.

FIG. 1 shows an example device 100 that includes portions 102, that can be rotationally secured by hinge assemblies 104. In this case, the portions include first portion 102(1) that is manifest as a tablet 106, second portion 102(2) that is manifest as a keyboard 108, and portion 102(3) that is manifest as a kickstand 110. Hinge assembly 104(1) rotatably couples portions 102(1) and 102(2) around hinge axis (HA1) and hinge assembly 104(2) rotatably couples portions 102(2) and 102(3) around hinge axis (HA2). A compact tunable leaf spring assembly (CTLSA) 112 can receive and impart forces between elements of the device. In this example, compact tunable leaf spring assembly 112(1) is positioned relative to tablet 106 and keyboard 108. Similarly, compact tunable leaf spring assembly 112(2) is positioned relative to tablet 106 and kickstand 110. Note that the compact tunable leaf spring assemblies 112 are shown in ghost to indicate that they would normally be occluded by other elements and therefore would not be visible in this view.

Compact tunable leaf spring assemblies 112 lend themselves to dimensionally-constrained applications. For instance, tablet 106 can have a dimensionally-constrained thickness (T). Compact tunable leaf spring assembly 112(2) can provide defined force values within this constrained thickness. (Note that thickness is often referred to relative to the z reference direction and the two are parallel when the measured element is positioned horizontally (e.g., in the position of the keyboard 108 in FIG. 1)).

Note that while specific applications for CTLSAs 112 are illustrated for purposes of explanation, CTLSAs can be employed between any two device elements that have relative movement and/or impart forces on one another.

Figure 2A:
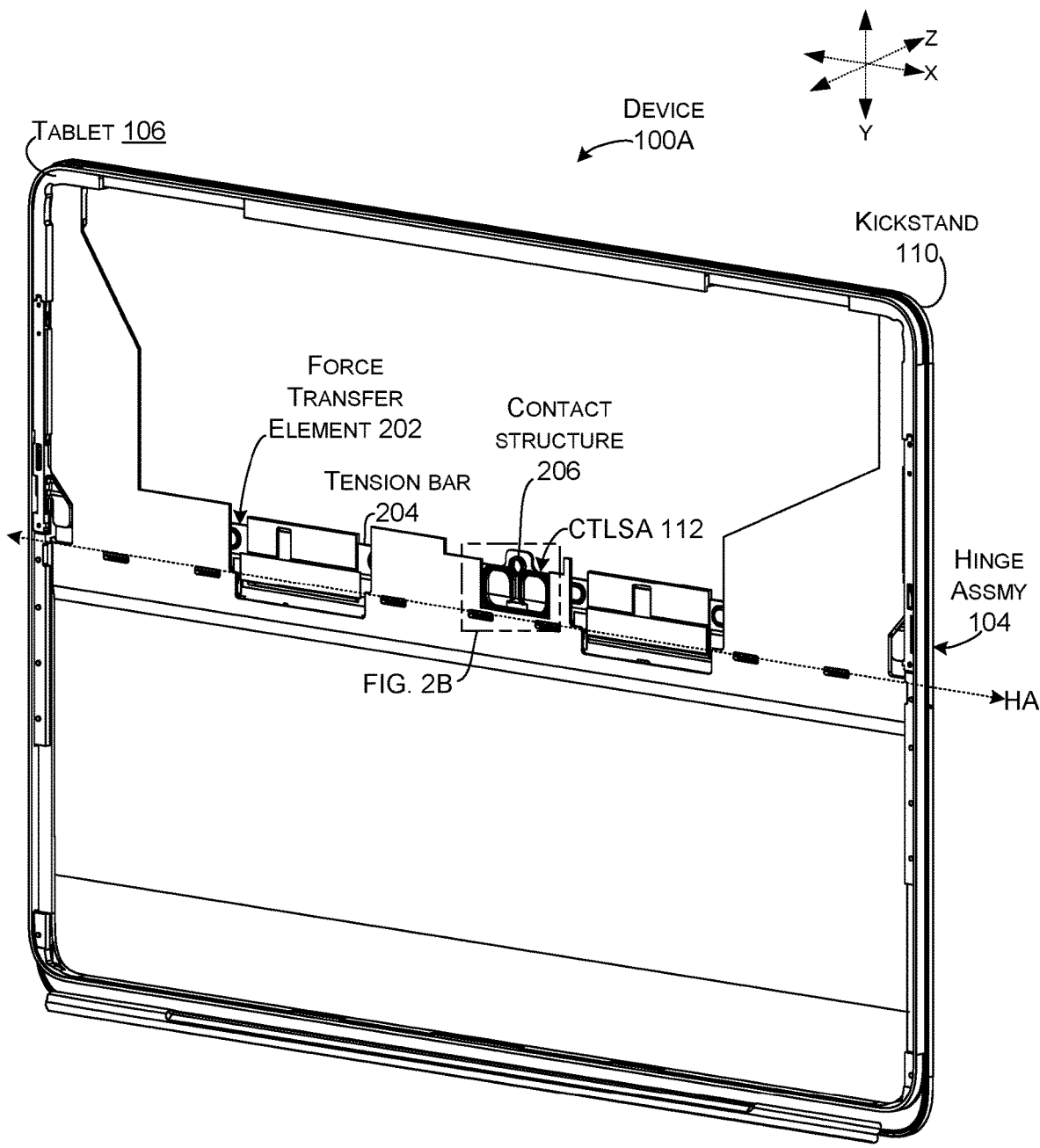
Figure 2B:
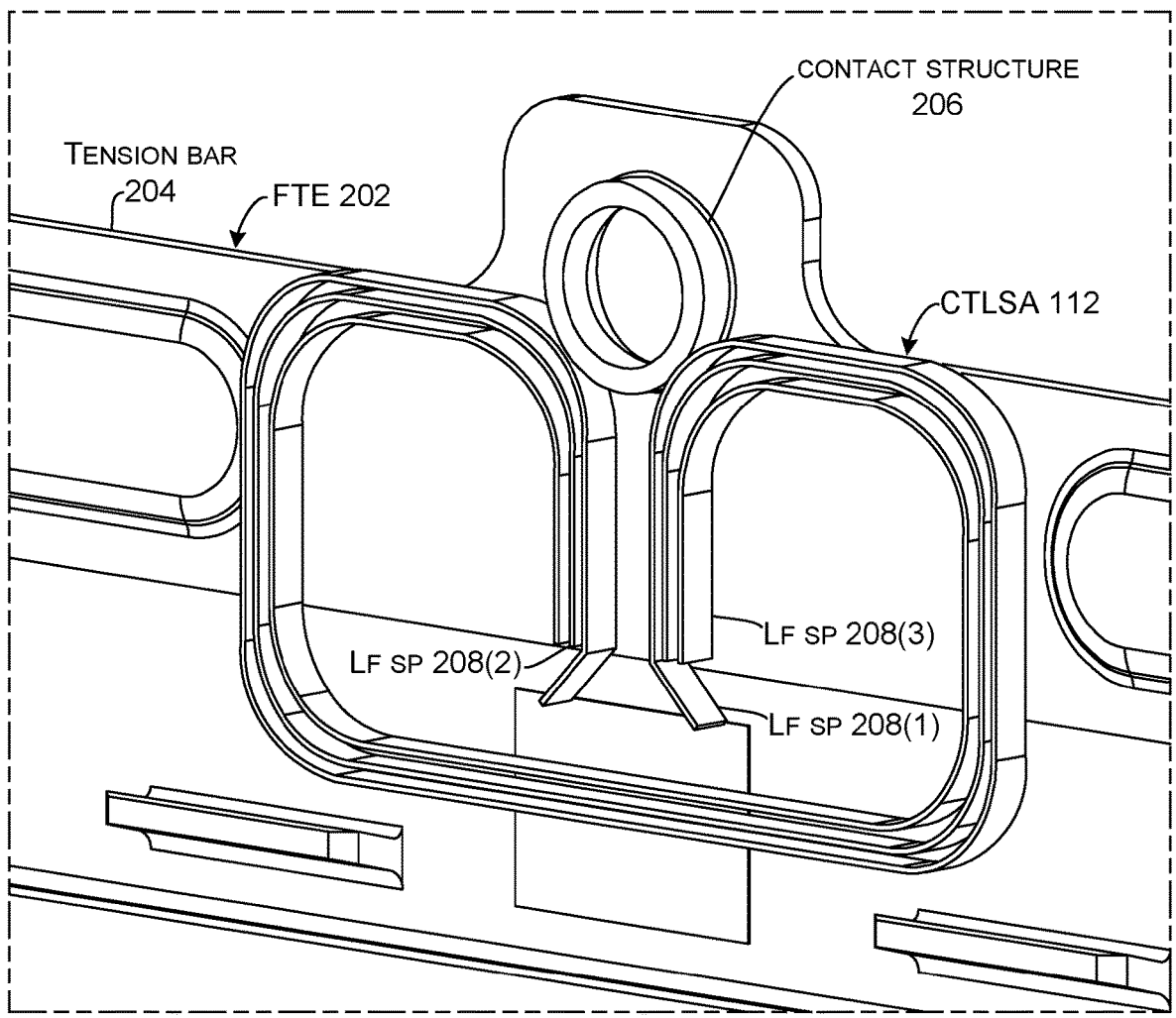

FIGS. 2A and 2B collectively show another example device 100A, that is similar to device 100 of FIG. 1. In this case, the device 100A includes a tablet 106 and a kickstand 110 that are rotationally secured by hinge assembly 104. CTLSA 112 is configured to impart forces between two elements of the device. In this case, the two elements are the tablet 106 and the kickstand 110. The CTLSA 112 can be positioned against the tablet 106 and can be engaged by a force transfer element 202. In this example, the force transfer element 202 is manifest as a tension bar 204 that is linked to the kickstand side of hinge assembly 104. The tension bar 204 defines a contact structure 206 that can be forced against the CTLSA 112 by rotation of the kickstand 110 and in turn can receive forces from the CTLSA 112 to transfer to the kickstand 110. It is contemplated that the CTLSA can be used in other scenarios besides those illustrated and discussed here where a compact force or biasing agent is desired.

The CTLSA 112 can include multiple nested leaf springs 208. As can be seen in FIG. 2B, the illustrated implementation includes three nested leaf springs 208(1), 208(2), and 208(3). The CTLSA 112 can provide a small format package of multiple nested leaf springs 208 that can be adjusted (tuned) to a wide range of force/deflection characteristics, including high force and high stroke (deflection in the y reference direction). In contrast, typical helical coil springs require a relatively larger diameter (requiring a correspondingly larger thickness) than the present nested leaf springs (on the order of two or more times higher) in order to provide equivalent force/deflection characteristics. This can be a challenge when thickness and/or other dimensions for the spring is limited. The nested leaf springs can provide high stiffness and high stroke in a very small space. In addition, the stiffness characteristics of the CTLSA can be adjusted by varying various parameters, allowing a wide range of linear and nonlinear response profiles.

Figure 3A:
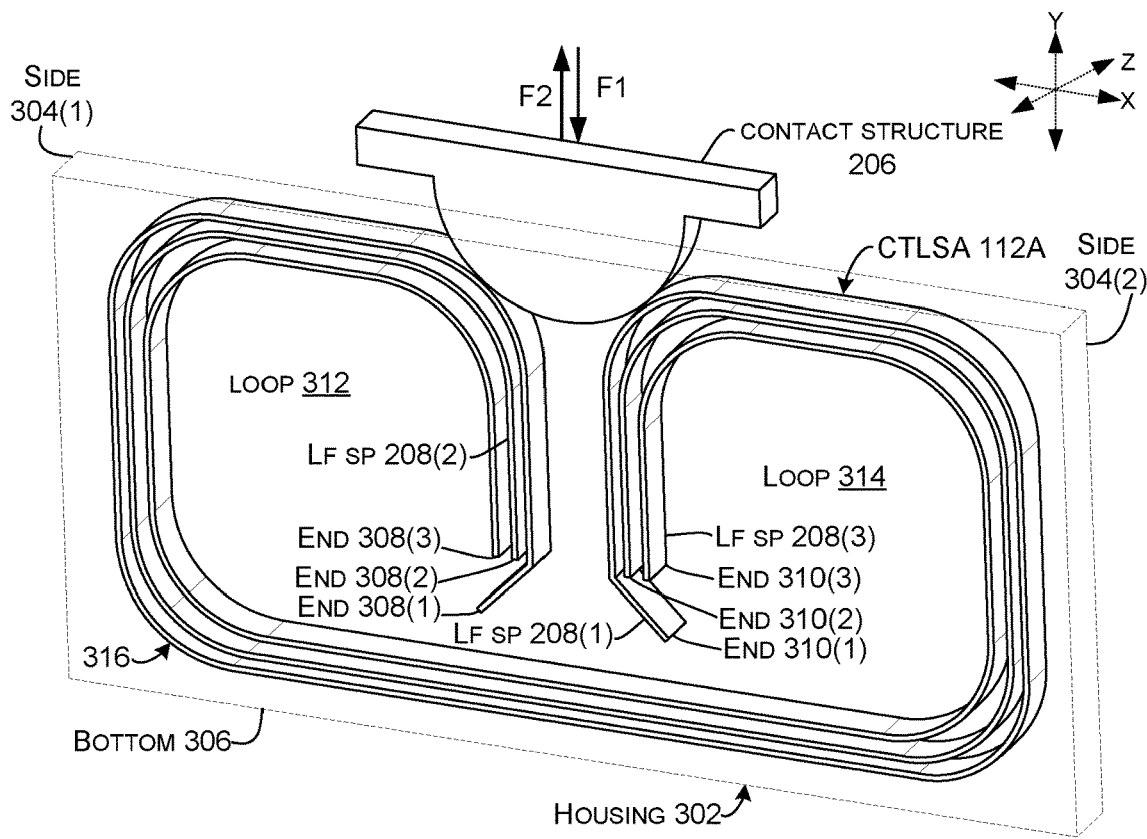
Figure 3B:
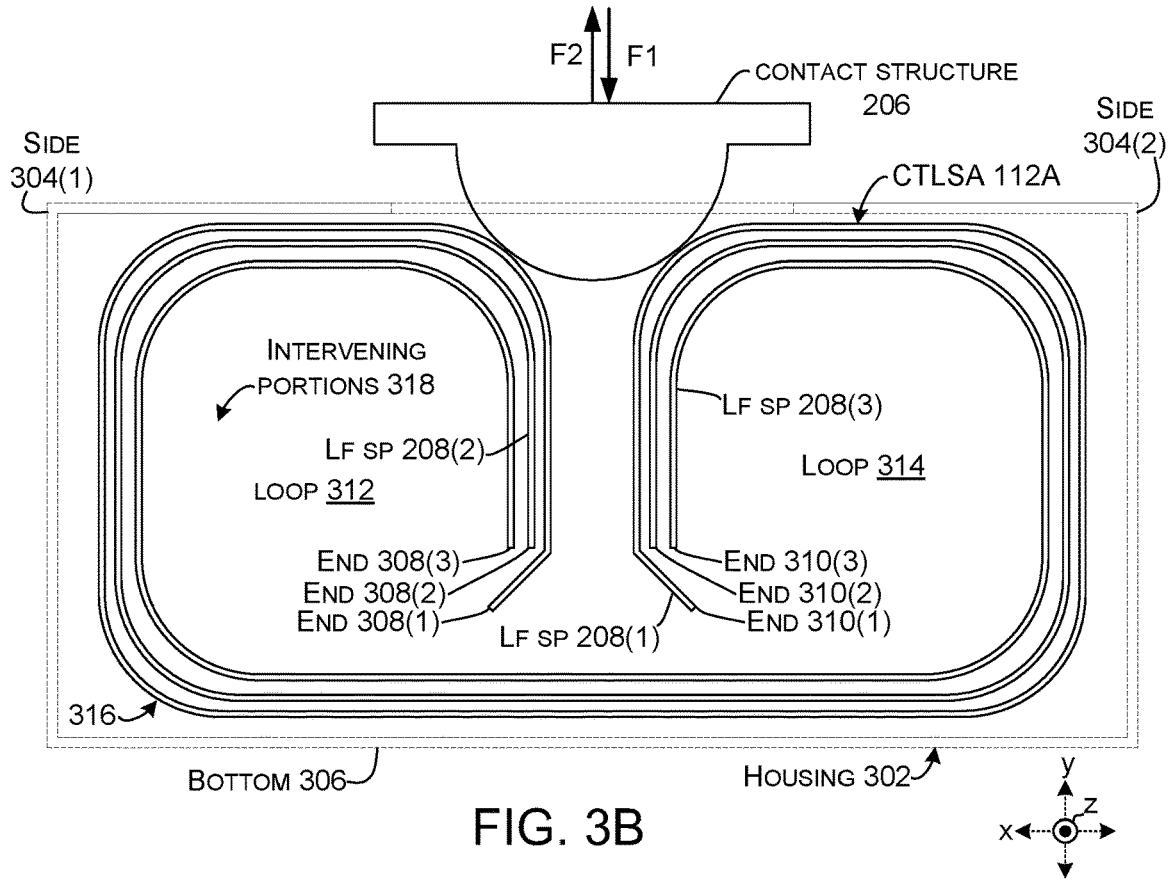
FIGS. 3B, 4A-4D, 5A and 5B, 6-8, 9A-9D, and 10 show elevational views of example devices in accordance with some implementations of the present concepts.

FIGS. 3A-3B collectively show an example layout of another CTLSA 112A. The suffix "A" is used to indicate that elements of CTLSA 112A may be the same or different from those of CTLSA 112 introduced above relative to FIG. 1 and/or to other CTLSAs discussed below. In this case, the CTLSA 112A includes and/or interacts with a housing 302. Note that from one perspective, the 'housing' can be any structure the leaf springs 208 contact. In other cases, such as the illustrated configuration of FIGS. 3A-3B, the housing can be a dedicated structure. In this example, the housing 302 defines a perimeter that generally approximates a portion of a rectangle and includes vertical sides 304 connected by a bottom 306. In this case, the perimeter is generally planar. A downward force F1 can be applied to the CTLSA 112A via contact structure 206 and the CTLSA 112A can generate an opposing upward reaction force F2. This aspect is described in more detail below relative to FIGS. 4A-4E.

Figure 8:
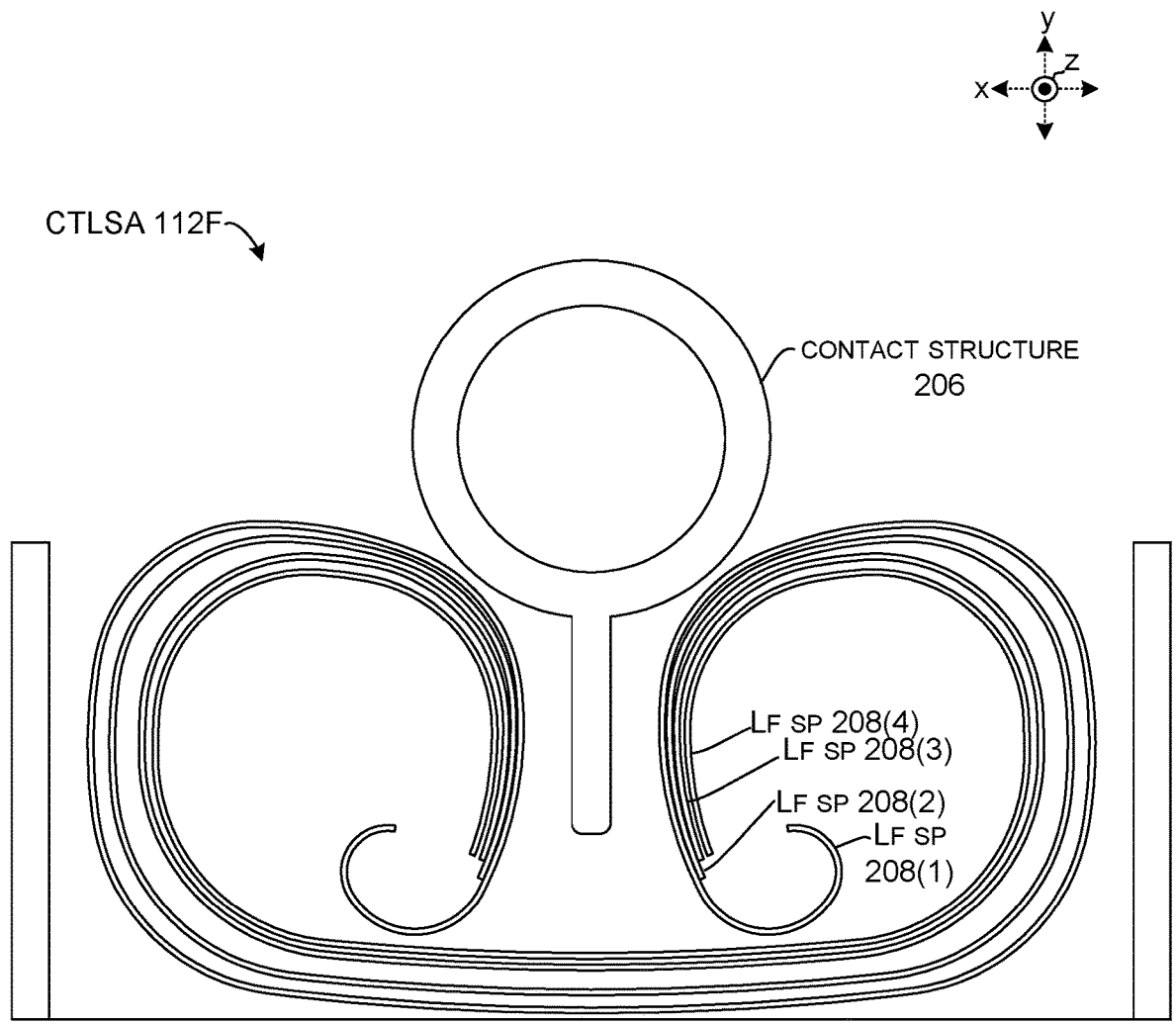

Note that in this implementation, the leaf springs 208 extend from a first end 308 to a second end 310 and define two loops 312 and 314. The loops collectively define at least part of perimeter 316 of the leaf springs. In this case, perimeter 316 defined by the leaf springs is contained in the perimeter defined by the housing (e.g., within the bounds of the housing). The shape of the loops 312 and 314 can affect a force profile of the CTLSA 112. In this implementation, the loops 312 and 314 generally approximate a portion of a rectangle (e.g., are rectangular in shape). Other implementations can have different shapes. For instance, FIG. 8 shows an implementation where the loops approximate a portion of an oval.

Note, the ends 308 and 310 can be contained within the perimeter 316 and are not directly secured to either of the first or second portions, which in this case are manifest as the contact structure 206 and the housing 302. Instead, the ends 308 and 310 are unbound and are free to move when stress forces are imparted between the contact structure and the housing. Further, the shape of the leaf springs and the housing 302 can cause contact between extensive intervening portions 318 (labeled on FIG. 3B) (e.g., between the ends 308 and 310) to contact the housing. This can be contrasted with traditional leaf spring configurations where the ends are secured to a first portion and the midpoint of the leaf spring is secured to a second portion that can move relative to the first portion.

FIGS. 4A-4D collectively show an example layout of another CTLSA 112B. The suffix "B" is used to indicate that elements of CTLSA 112B may be the same or different from those of CTLSAs described above and/or below. In this case, CTLSA 112B includes three leaf springs 208. Further, the contact structure 206 includes a stroke or displacement limiter 402.

Figure 4A:
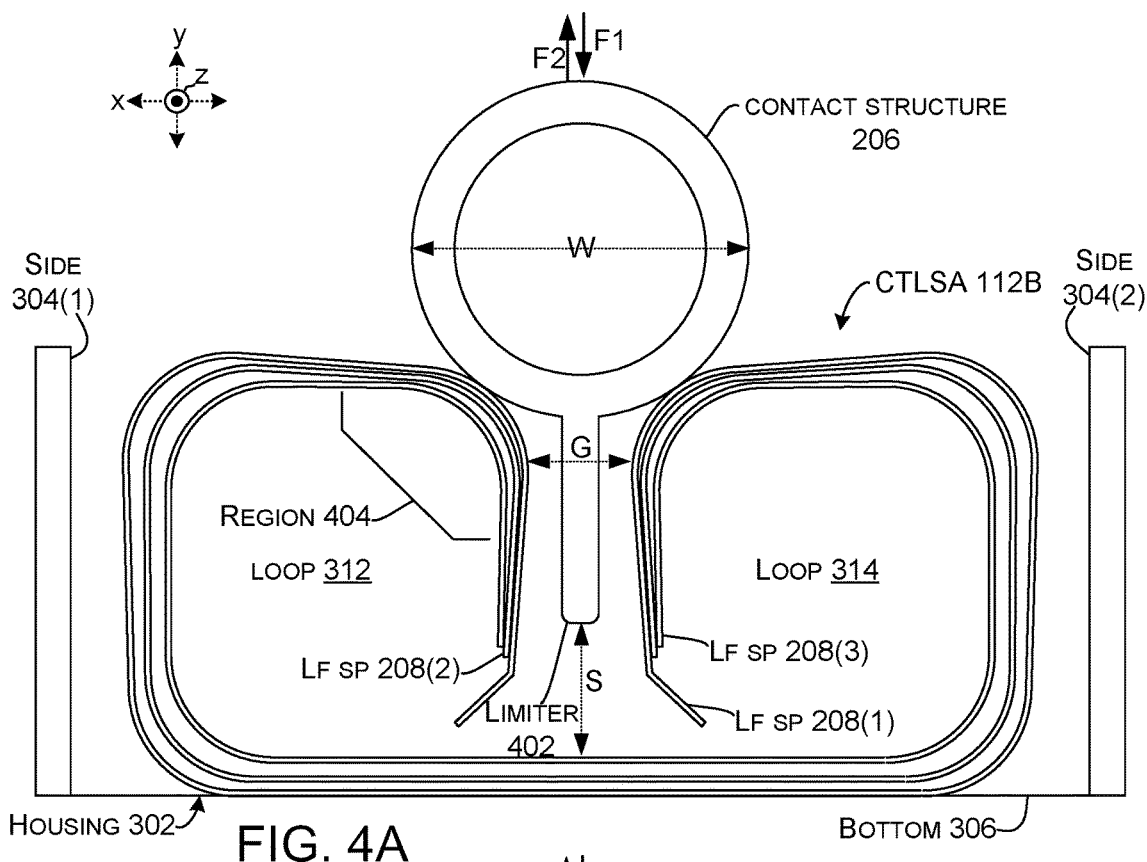

FIG. 4A shows the contact structure 206 just beginning to contact the CTLSA 112B as the contact structure moves along a stroke S. In this case, a dimension W (e.g., width or diameter) of the contact structure 206 is greater than a distance or gap G between the loops 312 and 314. The movement of the contact structure 206 can be due to downward force F1 and impart forces on regions 404 of the leaf springs 208. (Note that to avoid clutter on the drawing page, the regions described relative to FIGS. 4A-4D are only specifically designated on the left side of the CTLSA 112B but are applicable on the right side as well). This force F1 causes individual leaf springs 208 within a loop 312 or 314 to interact with one another at region 404, which can produce a reaction force F2. This interaction can cause deformation of the individual leaf springs 208 at region 404 to provide a relatively small reaction force F2 when accommodating the compression from the contact structure 206. As will be explained in the sequence below, as different regions of the leaf springs 208 experience self-contact, contact with the housing 302, and/or contact with other leaf springs, the reaction force can increase.

Note also that in this implementation the leaf springs 208 are bilaterally symmetrical when viewed along the stroke S of the contact structure. Thus, effects of the contact structure 206 on the left and right sides of the leaf springs (e.g. loops 312 and 314) tends to be equivalent. Other implementations may be different on the left and right sides.

Figure 4B:
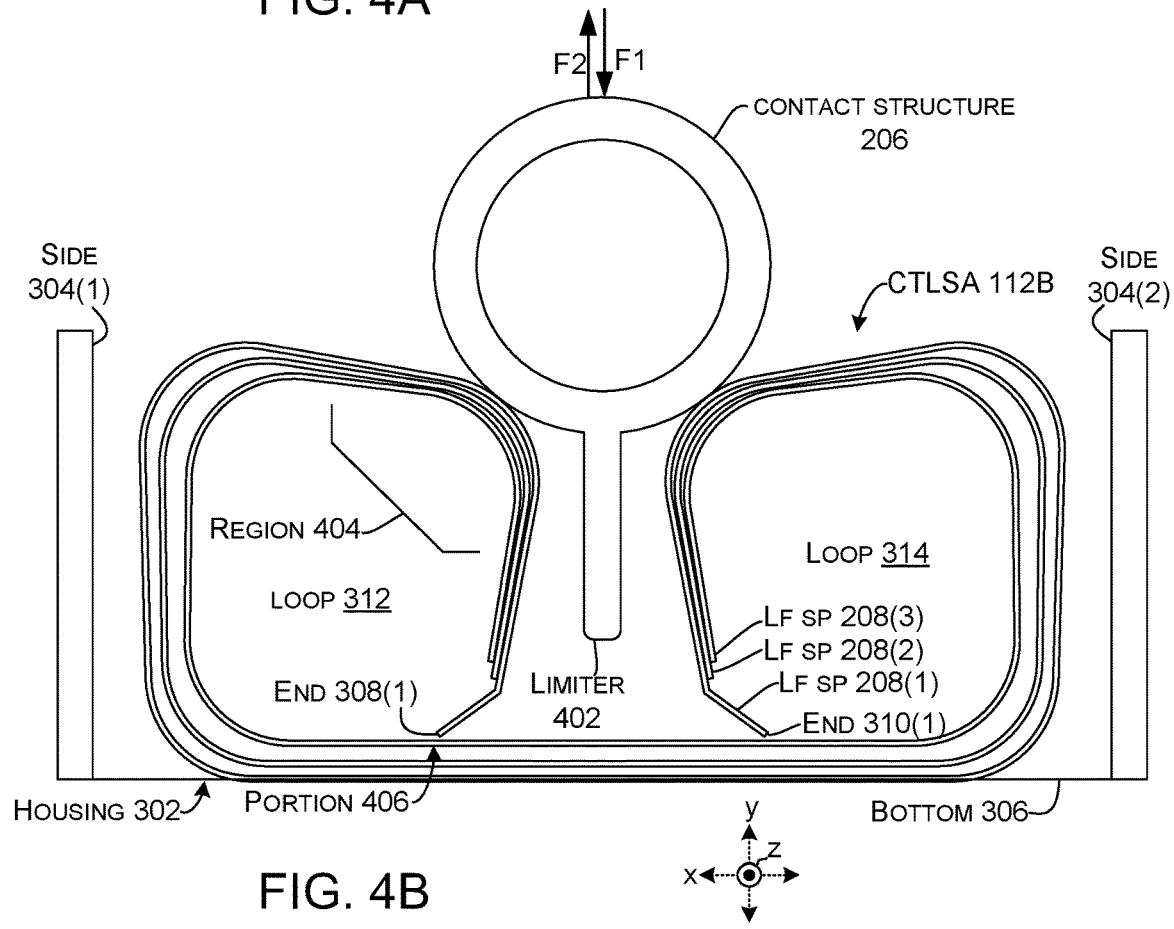

FIG. 4B shows the contact structure 206 continuing to move downward and exert forces on CTLSA 112B. At this point, ends 308(1) and 310(1) of outermost leaf spring 208(1) begin to contact an intermediate or interim portion 406 of leaf spring 208(1). This self-contact increases the resistance of the leaf springs 208 to further downward movement of the contact structure 206. Accordingly, the reaction force F2 can increase relative to the reaction force F2 of FIG. 4A.

Figure 4C:
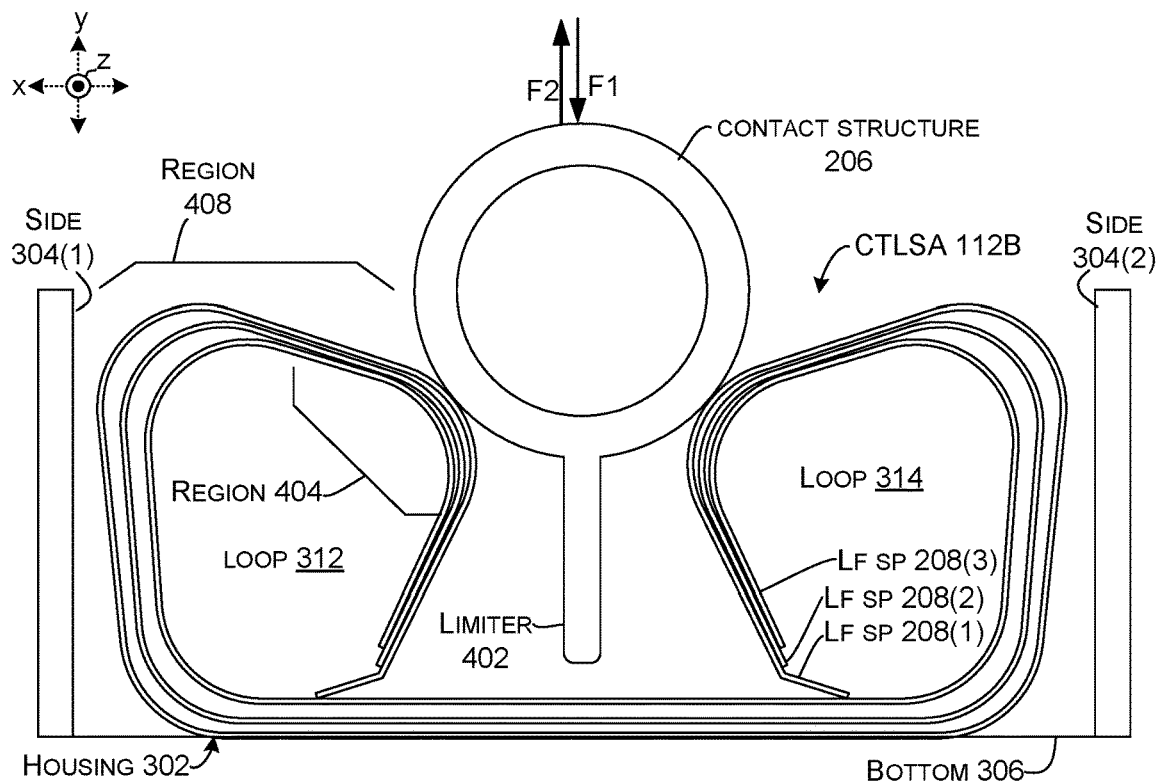

FIG. 4C shows the contact structure 206 continuing to move downward along its stroke and exert forces on CTLSA 112B. At this point, the self-contact explained above relative to FIG. 4B limits further downward deflection of region 404. As a result, the downward movement of the contact structure 206 pushes upper regions 408 outward laterally away from each other and toward sides 304. Accordingly, the reaction force F2 can increase relative to the reaction force F2 of FIG. 4B.

Figure 4D:
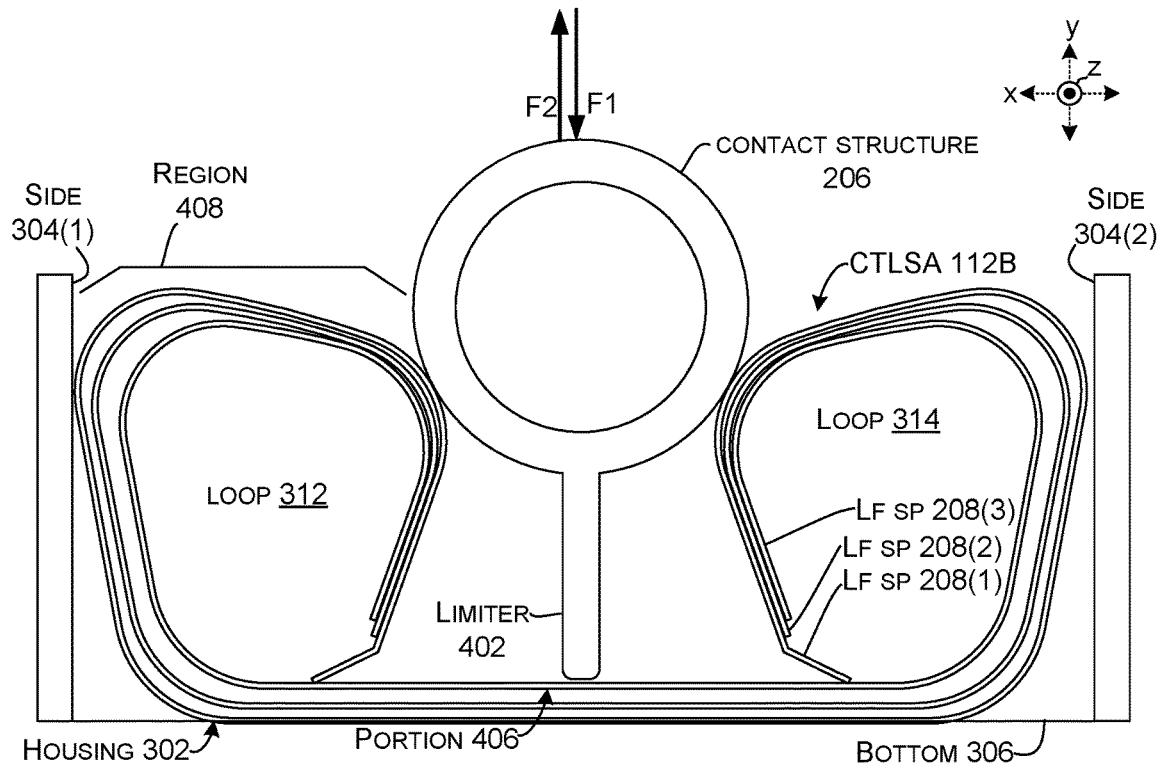

FIG. 4D shows the contact structure 206 continuing to move downward and exert forces on CTLSA 112B. At this point, the regions 408 are engaging sides 304, which limit further opening of the spring (e.g. the left side of the leaf spring region 408 is blocked from moving farther away from the right side of the leaf spring). As a result, further displacement causes internal compression of the left side (e.g., region 408) between the contact structure 206 and the side 304(1) (and similar compression is caused on the right side of the CTLSA 112B). Accordingly, the reaction force F2 can increase relative to the reaction force F2 of FIG. 4C. Thus, from one perspective the reaction force F2 can increase as vertical displacement of the contact structure increases because more regions of the leaf springs become involved in the displacement.

FIG. 4D also shows the limiter 402 starting to contact leaf spring 208(3) at its interim portion 406. The interim portion is elevated slightly above the bottom 306 of housing 302. Displacing the interim portion against the bottom will contribute to the reaction force F2. Once contact has occurred further displacement is blocked. Thus, the stroke of the displacement of the contact structure 206 can be measured as the vertical position change of the contact structure 206 between FIG. 4A and FIG. 4D. (As mentioned above, there is a slight amount of additional displacement before FIG. 4A and after FIG. 4D).

As explained above, as different regions of the leaf springs 208 experience self-contact, contact with the housing, and/or contact with other leaf springs, the reaction force can change. These can be considered examples of parameters that can be adjusted to shape the desired reaction force profile of the CTLSA 112B. Further parameters can include: spring thickness (in the z reference direction); spring width (in the x reference direction); housing width (in the x reference direction); housing height (in the y reference direction); contact structure dimensions (e.g., diameter); number of leaf springs; clearance between housing and outer leaf spring of the spring nest; spacing of internal springs of spring nest; clearance between outer spring ends and top and bottom of the housing; outer spring end bend angle; and/or spring corner bend radius, among others. Several of these parameters are discussed above relative to FIGS. 4A-4D. Several parameters are described in the discussion below relative to FIGS. 5A-10.

Figure 5A:
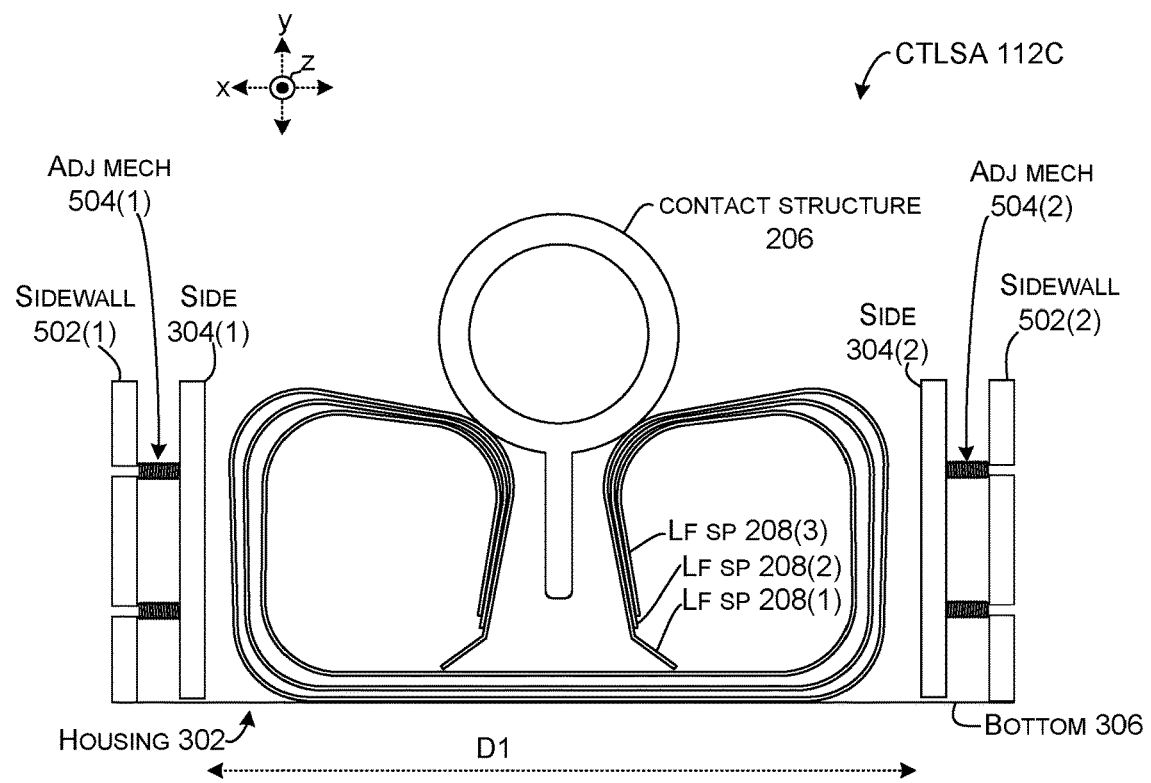
Figure 5B:
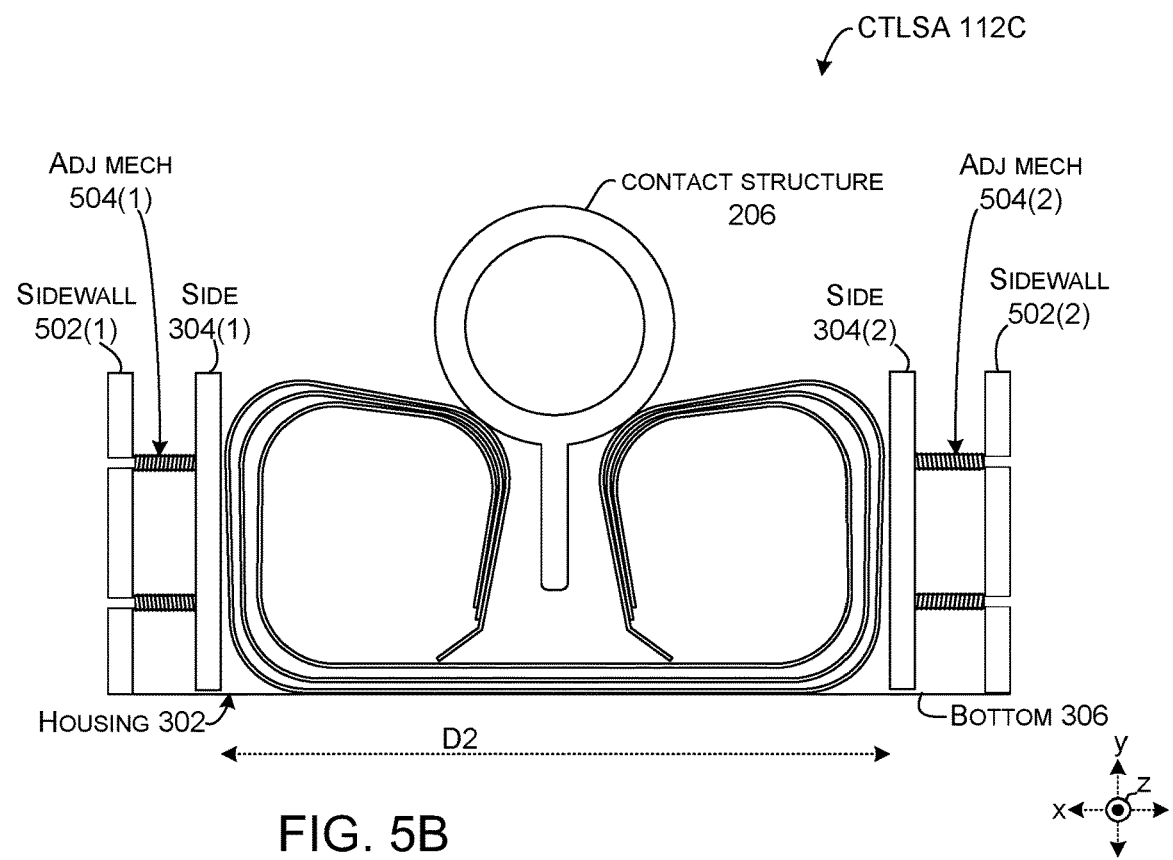

FIGS. 5A and 5B collectively show another example CTLSA 112C that includes an adjustable housing 302. In this case, the housing 302 includes a fixed bottom 306 secured to fixed sidewalls 502. The fixed sidewalls 502 are adjustably secured to sides 304 via adjustment mechanisms 504. The function of the adjustment mechanism 504 can be understood by comparing distance D1 between sides 304 in FIG. 5A to distance D2 between the sides 304 in FIG. 5B. In FIG. 5A distance D1 is greater and the left and right sides of the leaf springs 208 have more room to move away from each other before contacting sides 304. In contrast, in FIG. 5B, the sides have been adjusted toward each other to decrease the distance between the sides 304. As such, the sides of the leaf springs will contact the sides 304 sooner (e.g., when less vertical stroke of the contact structure 206 has occurred compared to FIG. 5A). Thus, the reaction force profile of the CTLSA 112C in FIG. 5A will be different than the reaction force profile of the CTLSA 112C in the configuration of FIG. 5B.

Figure 6:
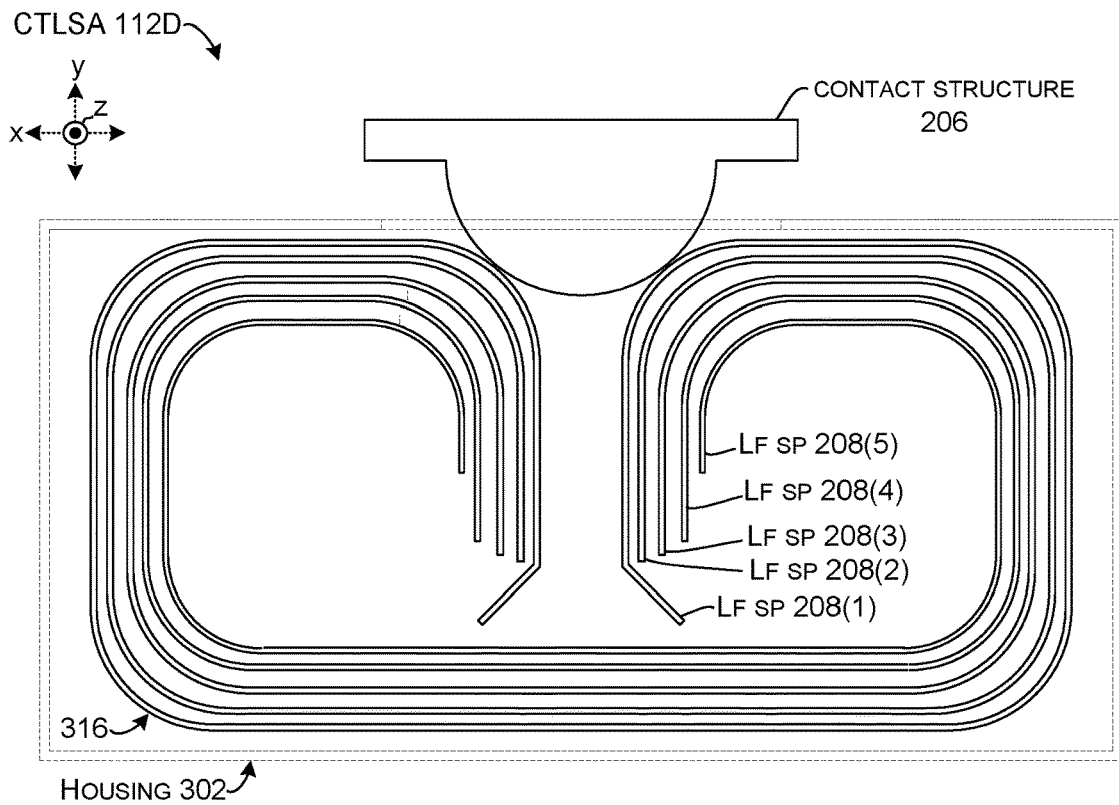

FIG. 6 shows another example CTLSA 112D that includes five leaf springs 208(1)-208(5) nested within housing 302 and that define a perimeter 316. In this example, the perimeter is planar (e.g., lies in xy reference plane). In this case, all of the leaf springs terminate with a vertical run beneath the contact structure 206. Increasing the number of leaf springs 208 can change the reaction force profile of the CTLSA 112D, such as by making the reaction force greater.

Figure 7:
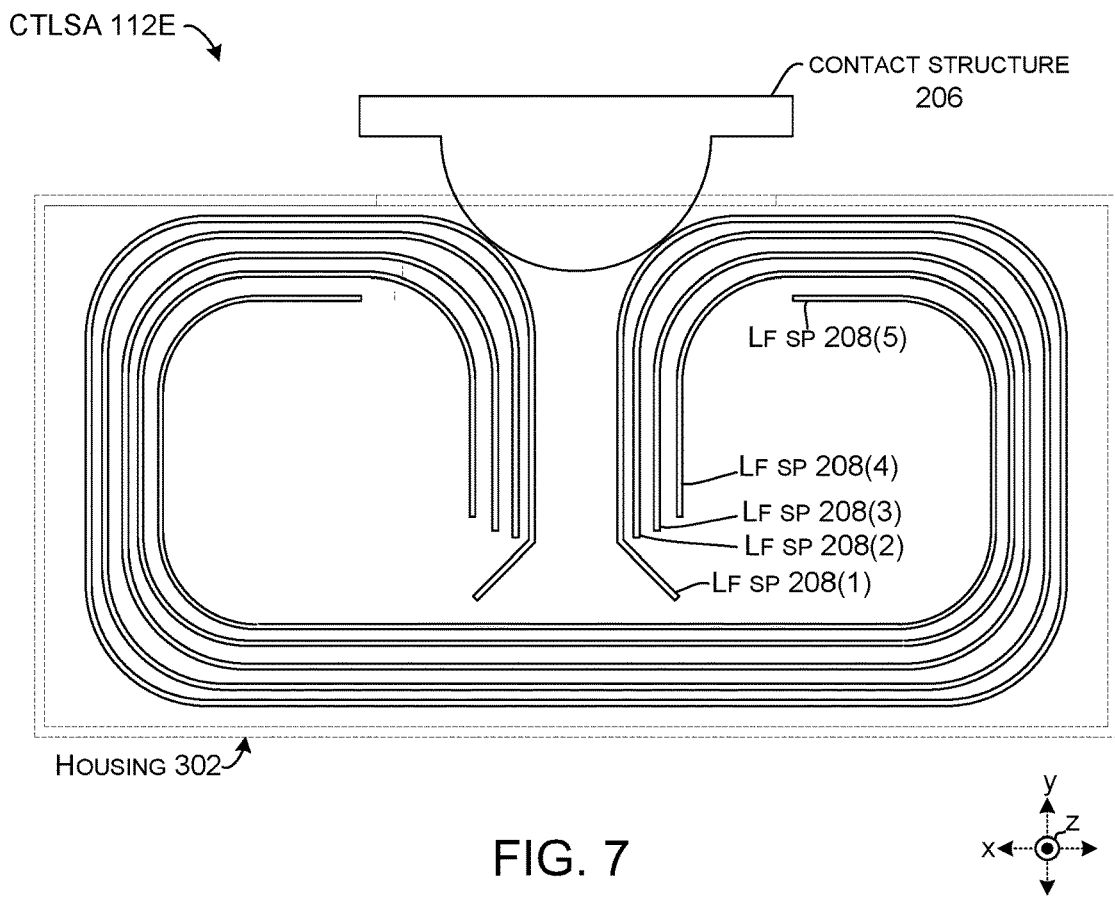

FIG. 7 shows another example CTLSA 112E that is similar to CTLSA 112D of FIG. 6. However, in this case, leaf spring 208(5) terminates with a horizontal run outside the bounds of the contact structure. In this configuration, leaf spring 208(5) does not contribute to the reactive force until later in the vertical stroke of the contact structure 206 when compared to the implementation of FIG. 6. Thus, the terminus of the leaf springs can be a parameter that can alter the reaction force profile of the CTLSA 112E.

FIG. 8 shows another example CTLSA 112F. When compared to FIGS. 6 and 7, the bends of the leaf spring 208 in FIG. 8 tend to be more gradual and continuous so that the leaf springs approximate portions of two side-by-side ovals. In contrast, in the implementations of FIGS. 6 and 7, the bends tend to be sharper and tend to be separate by generally straight sections so that the leaf springs approximate portions of two side-by-side rectangles or squares. Thus, the shape of the leaf springs can be a parameter that can alter the reaction force profile of the CTLSA 112F.

FIGS. 9A-9D collectively show another example CTLSA 112G. In this case, the CTLSA includes housing 302 and three nested leaf springs 208(1)-208(3). In this implementation, as shown in the sequence represented by FIGS. 9A-9C, initially as the contact structure 206 begins to move downward, the CTLSA 112G can function in a similar manner to other example CTLSAs described above. Note however, that in this case, the leaf springs 208 are shaped to define opposing indents 902. The indents 902 can collectively define an inner perimeter (e.g., circumference) that approximates an outer perimeter (e.g., circumference) of the contact structure.

Figure 9A:
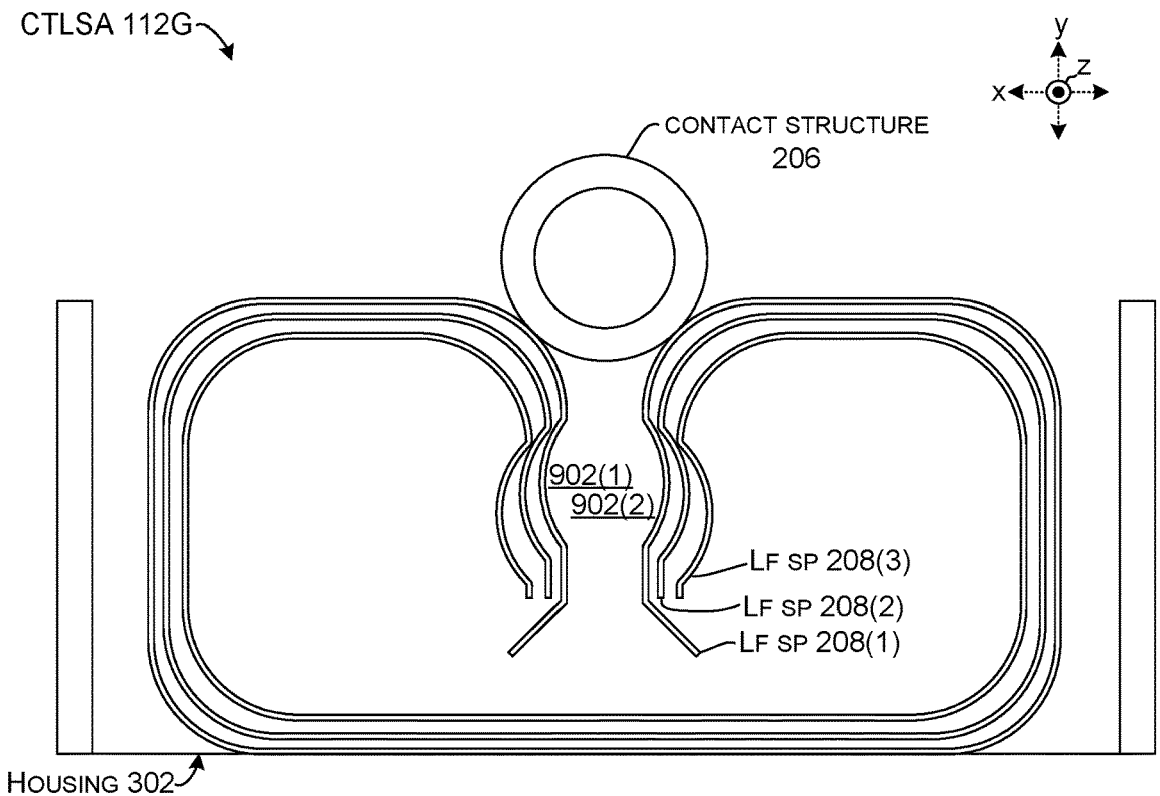
Figure 9B:
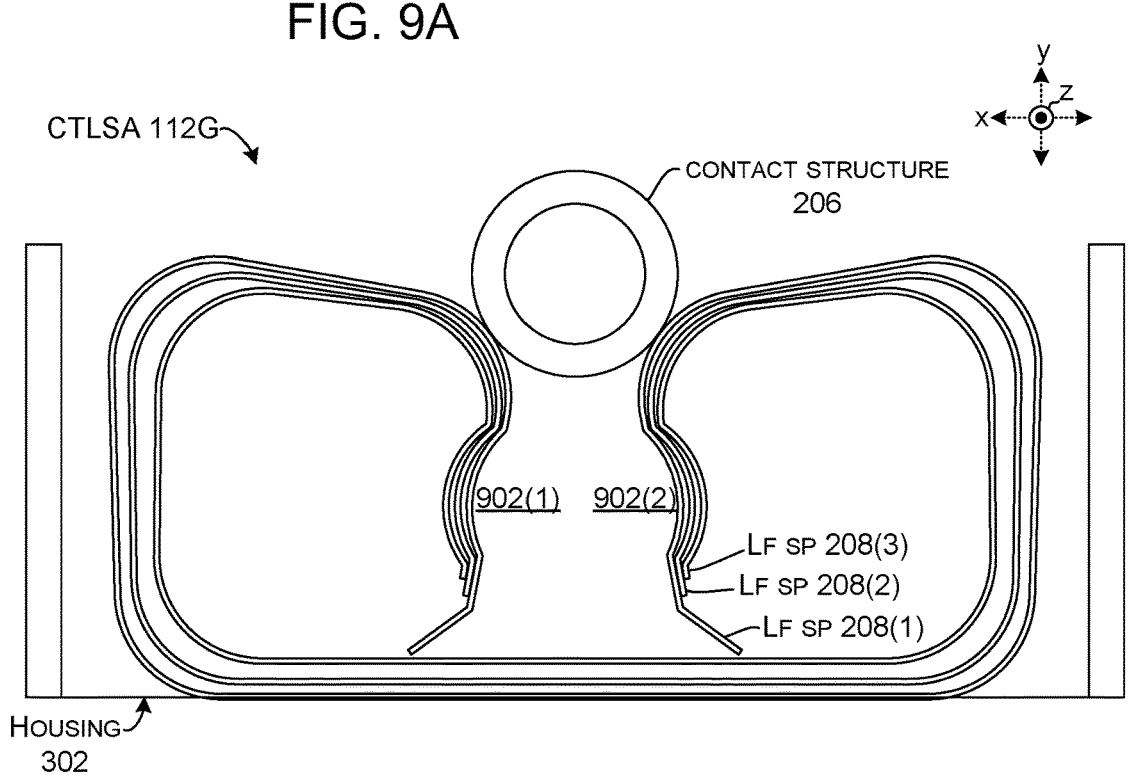
Figure 9C:
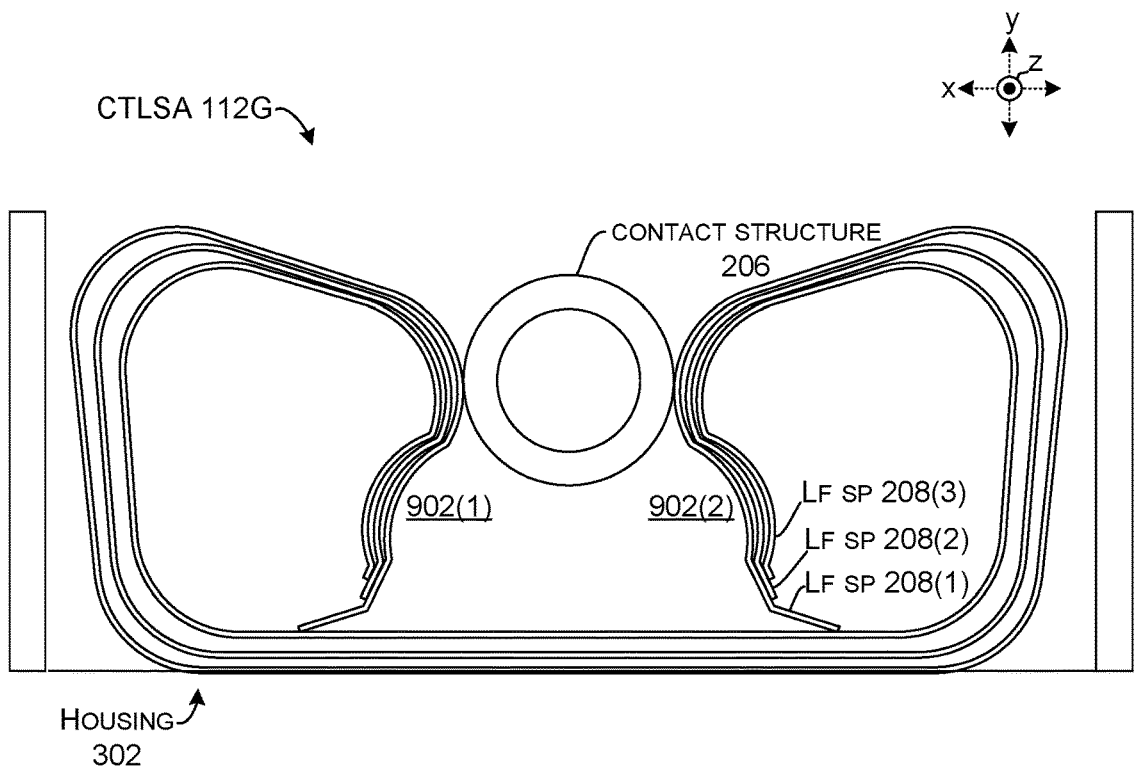
Figure 9D:
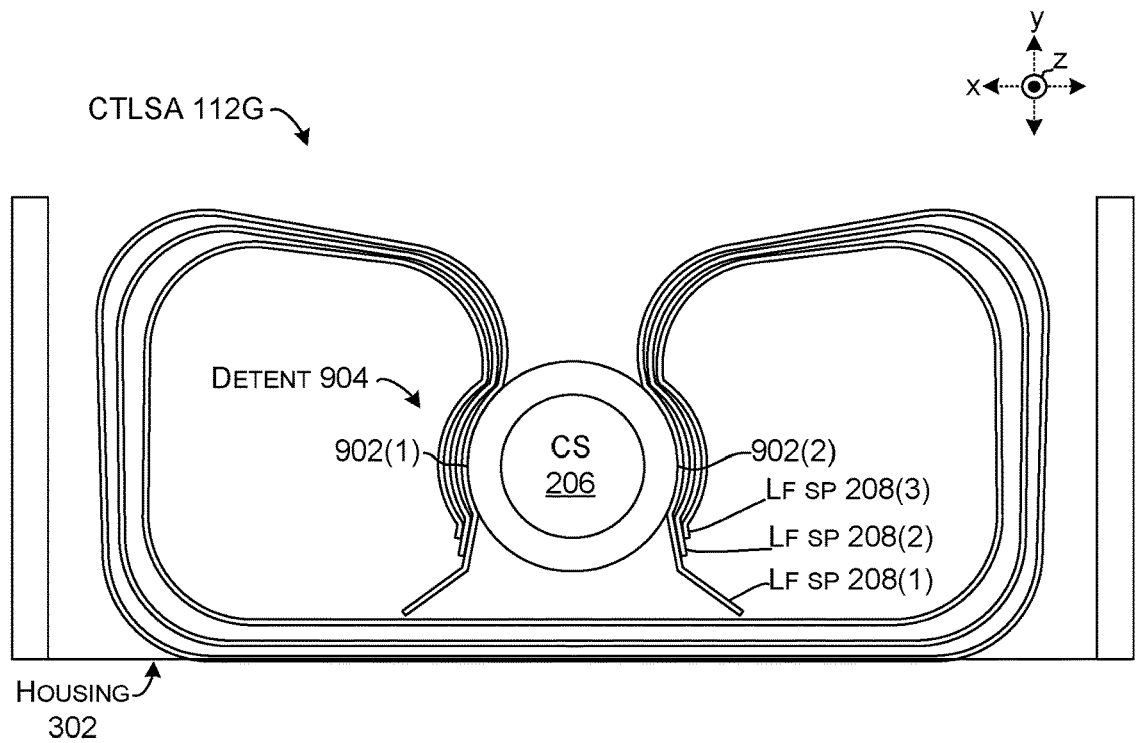

FIG. 9D shows the downward movement of the contact structure 206 along its stroke has aligned the contact structure with the indents 902 and leaf springs 208 have rebounded around the contact structure. At this point, the leaf springs 208 and their associated indents 902 can function as a detent 904 to retain the contact structure 206.

Thus, in the sequence shown in FIGS. 9A-9C, the reaction force profile of CTLSA 112G can be similar to the reaction force profiles of implementations described above. However, when the contact structure 206 is engaged by the detent 904 in FIG. 9D, the reaction force profile diverges from those above in that rather than 'pushing back' against the downward movement of the contact structure, the detent now applies a retention force, such that additional force is required to move the contact structure upward or downward out of the detent. Once out of the detent, the reaction force profile can one again be similar to other reaction force profiles described above.

Figure 10:
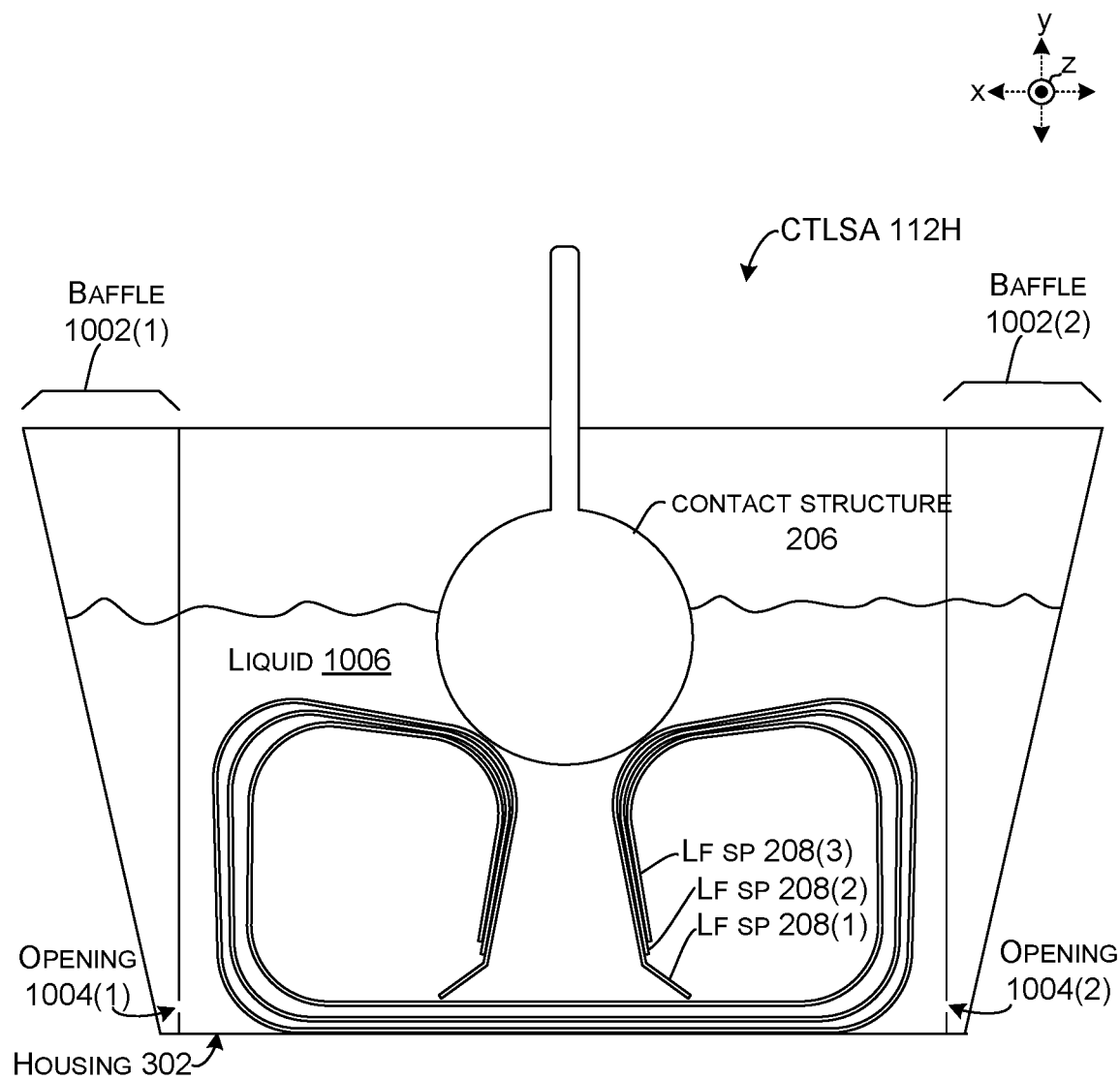

FIG. 10 shows another example CTLSA 112H. In this case, housing 302 is sealed and defines baffles 1002 and openings 1004. The housing 302 can be partially filled with liquid 1006 to provide a dampening effect on vertical movement of the contact structure 206.

From one perspective, as downward force from the contact structure 206 causes deformation of the leaf springs 208, they displace fluid and induce non-recoverable fluid shear forces. Such a CTLSA can be used to reduce mechanical vibration and can function as a spring and damper simultaneously. If damping only is required with minimal stiffness, a small spring thickness can be specified.

Figure 11:
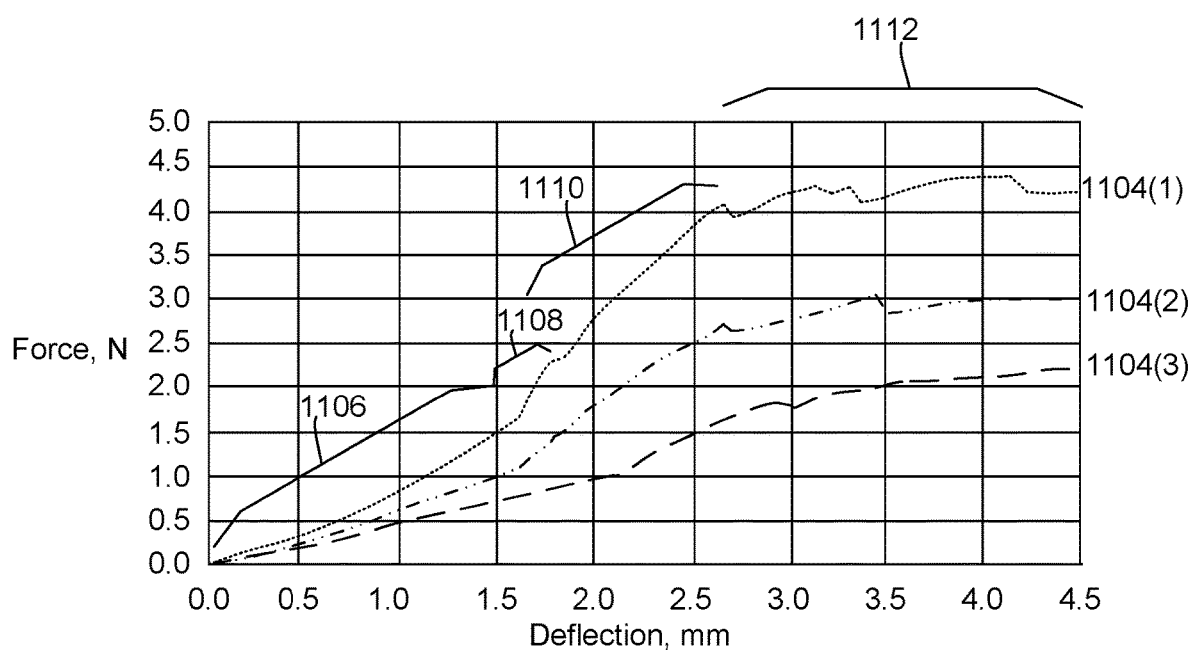
FIG. 11 shows an example force profile graph in accordance with some implementations of the present concepts.

FIG. 11 shows a graph 1102 of example reaction force profiles (e.g., force/displacement profiles) 1104 that can be generated by example CTLSAs. The reaction force profiles 1104 represent deflection in millimeters on the horizontal axis and Force in Newtons on the vertical axis.

Reaction force profile 1104(1) relates to a CTLSA implementation that employs three leaf springs having overall dimensions of 24 millimeters (mm) wide (in the x reference direction) by 12 mm high (in the y reference direction). Individual leaf springs are 1 mm (in the z reference direction) by 0.2 mm (in the x or y reference directions).

Reaction force profile 1104(2) relates a CTLSA implementation that employs three leaf springs having overall dimensions of 24 millimeters (mm) wide (in the x reference direction) by 12 mm high (in the y reference direction). Individual leaf springs are 1 mm (in the z reference direction) by 0.175 mm (in the x or y reference directions) (e.g., 0.025 thinner than the leaf springs of reaction force profile 1104(1). Reaction force profile 1104(3) relates to a CTLSA implementation that employs two leaf springs instead of three, but otherwise has the same dimensions as the CTLSA of reaction force profile 1104(2).

As mentioned above, the reaction force F2 can relate to the degree of leaf spring engagement, which can relate to multiple parameters including the overall size, number of leaf springs, and/or dimensions of leaf springs detailed in the directly preceding paragraph.

This aspect can be understood by reviewing example reaction force profile 1104(1) in combination with FIGS. 4A-4D. FIG. 4A shows the reaction force is generated by region 404 and tends to have a first range 1106 associated with this engagement. This continues to be the case until spring ends 308 and 310 contact interim portion 406 in FIG. 4B. This contact adds to the reaction force in a second range 1108. Next the vertical compression and horizontal displacement of FIG. 4C is added to the deformation force in a third range 1110. This continues until the leaf springs contact sides 304 in FIG. 4D and the deformation of each side of the hinge springs is added to the reaction force in a fourth range 1112. At this point, which in some implementations is reached at about 2.5-3 mm of stroke, the reaction force can stay relatively constant for the rest of the stroke of the contact structure.

Reaction force profile 1104(2) shows the effect of reducing the leaf spring thickness parameter from 0.2 mm to 0.175 mm. Reaction force profile 1104(3) shows the effect of changing the parameter relating to the number of leaf spring from three to two, which reduces the force by about 33%, and the reaction force profile is smoother. Of course, these are example reaction force profiles provided for purposes of explanation, but they highlight the predictable nature of the CTLSA and its customizability based on adjusting one or more parameters to achieve a desired reaction force profile.

In view of the description above, the CTLSA concepts can allow customization of the CTLSA components to achieve a broad range of spring stiffness (spring force), and a broad range of force/deflection profiles. There can be multiple leaf springs that deform and interact with one-another and/or with the housing. By changing the CTLSA dimensions and/or number of leaf springs, a wide range of spring force/deflection profiles can be achieved.

The leaf springs can be formed from any suitable material. For instance, spring steel could be employed, though other materials, such as stainless steel, other metals, polymers, and composites are contemplated. Within a CTLSA the leaf springs could all be constructed from the same material. Alternatively, some leaf springs could be made from one material while other leaf springs are made from another material.

The present CTLSA concepts can be utilized with any type of device, such as but not limited to, notebook computers, smart phones, wearable smart devices, tablets, and/or other types of existing, developing, and/or yet to be developed devices.

Although techniques, methods, devices, systems, etc., pertaining to compact leaf spring assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a tablet that is rotatable relative to a kickstand and a compact tunable leaf spring assembly positioned to receive forces associated with relative rotation between the tablet and the kickstand, the compact tunable leaf spring assembly including multiple nested leaf springs, individual leaf springs extending from a first end to a second end and defining a planar perimeter where the first end and the second end are contained within the perimeter and are not secured to either the tablet or the kickstand.

Another example can include any of the above and/or below examples where the compact tunable leaf spring assembly further comprises a housing and wherein a shape of the housing generally approximates the planar perimeter of the individual leaf springs.

Another example can include any of the above and/or below examples where the housing is positioned in the tablet.

Another example can include any of the above and/or below examples where the device further comprises a contact structure that is coupled to the kickstand.

Another example can include any of the above and/or below examples where rotation of the kickstand causes the contact structure to engage the leaf springs without contacting the ends of the leaf springs or a midpoint of the leaf springs.

Another example can include any of the above and/or below examples where the leaf springs are bilaterally symmetrical into left and right sides along a stroke of the contact structure.

Another example can include any of the above and/or below examples where movement of the contact structure along the stroke causes the left and right sides of the contact structure to move away from one another.

Another example can include any of the above and/or below examples where the left and right sides of the contact structure move away from one another until contacting the housing.

Another example includes a device comprising a first portion that is moveable relative to a second portion and multiple nested leaf springs positioned to receive forces between the first portion and the second portion, individual leaf springs extending from a first end associated with a first loop to a second end associated with a second loop and the first and second ends are not secured to either the first portion or the second portion to receive the forces.

Another example can include any of the above and/or below examples where the loops are symmetric.

Another example can include any of the above and/or below examples where the loops approximate a portion of a rectangle.

Another example can include any of the above and/or below examples where the loops approximate a portion of an oval.

Another example can include any of the above and/or below examples where all of the multiple nested leaf springs are the same shape.

Another example can include any of the above and/or below examples where an outermost individual leaf spring of the multiple nested leaf springs is a different shape than at least one other individual leaf spring.

Another example can include any of the above and/or below examples where the multiple nested leaf springs are positioned in the first portion and further comprise a contact structure linked to the second portion, the contact structure configured to move along a stroke between the first loop and the second loop.

Another example can include any of the above and/or below examples where the contact structure has an outside dimension that is greater than a gap between the first loop and the second loop.

Another example can include any of the above and/or below examples where movement of the contact structure along the stroke forces the first and second loops away from one another.

Another example can include any of the above and/or below examples where the multiple nested leaf springs are positioned within a housing contained in the first portion.

Another example can include any of the above and/or below examples where the movement of the contact structure along the stroke forces the first and second loops away from one another until the first and second loops contact the housing and then further movement of the contact structure along the stroke deforms the first and second loops.

Another example includes a device comprising a first portion that is moveable relative to a second portion and a leaf spring positioned to receive forces between the first portion and the second portion, the leaf spring extending from a first end to a second end and defining a perimeter where the first end and the second end are contained within the perimeter and not secured to either the first portion or the second portion.

Although techniques, methods, devices, systems, etc., pertaining to compact leaf springs are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:
1. A device, comprising:
a tablet that is rotatable relative to a kickstand; and,
a compact tunable leaf spring assembly positioned to receive forces associated with relative rotation between the tablet and the kickstand, the compact tunable leaf spring assembly including multiple nested leaf springs, individual leaf springs extending from a first end to a second end, forming two loops, and defining a planar perimeter where the first end and the second end are contained within the planar perimeter and are not secured to either the tablet or the kickstand.

2. The device of claim 1, wherein the compact tunable leaf spring assembly further comprises a housing and wherein a shape of the housing generally approximates the planar perimeter of the individual leaf springs.

3. The device of claim 2, wherein the housing is positioned in the tablet.

4. The device of claim 3, further comprising a contact structure that is coupled to the kickstand.

5. The device of claim 4, wherein rotation of the kickstand causes the contact structure to engage the leaf springs without contacting the ends of the leaf springs or a midpoint of the leaf springs.

6. The device of claim 5, wherein the leaf springs are bilaterally symmetrical into left and right sides along a stroke of the contact structure.

7. The device of claim 6, wherein movement of the contact structure along the stroke causes the left and right sides of the leaf springs to move away from one another.

8. The device of claim 7, wherein the left and right sides of the leaf springs move away from one another until contacting the housing.

9. A computing device, comprising:
a first portion of the computing device that is moveable relative to a second portion of the computing device; and,
multiple nested leaf springs positioned to receive forces between the first portion and the second portion, individual leaf springs extending from a first end associated with a first loop to a second end associated with a second loop, and the first and second ends are not secured to either the first portion or the second portion to receive the forces.

10. The computing device of claim 9, wherein the loops are symmetric.

11. The computing device of claim 9, wherein the loops approximate a portion of a rectangle.

12. The computing device of claim 9, wherein the loops approximate a portion of an oval.

13. The computing device of claim 9, wherein at least two of the multiple nested leaf springs are the same shape.

14. The computing device of claim 9, wherein an outermost individual leaf spring of the multiple nested leaf springs is a different shape than at least one other individual leaf spring.

15. The computing device of claim 9, wherein the multiple nested leaf springs are positioned in the first portion and further comprising a contact structure linked to the second portion, the contact structure configured to move along a stroke between the first loop and the second loop.

16. The computing device of claim 15, wherein the contact structure has an outside dimension that is greater than a gap between the first loop and the second loop.

17. The computing device of claim 16, wherein movement of the contact structure along the stroke forces the first and second loops away from one another.

18. The computing device of claim 17, wherein the multiple nested leaf springs are positioned within a housing contained in the first portion.

19. The computing device of claim 18, wherein the movement of the contact structure along the stroke forces the first and second loops away from one another until the first and second loops contact the housing and then further movement of the contact structure along the stroke deforms the first and second loops.

20. The computing device of claim 17, wherein the first portion has a dimensionally constrained thickness along a z-axis, and the leaf spring is compact along the z-axis to fit within the first portion.

21. A computing device, comprising:
a first portion of the computing device that is moveable relative to a second portion of the computing device; and,
a leaf spring positioned to receive forces between the first portion and the second portion, the leaf spring extending from a first end to a second end, forming two loops, and defining a perimeter where the first end and the second end are contained within the perimeter and not secured to either the first portion or the second portion.

* * * * *